US010328564B2

(12) United States Patent
Nowak, Jr. et al.

(10) Patent No.: US 10,328,564 B2
(45) Date of Patent: Jun. 25, 2019

(54) CONTROLLING INCOMING AIR FOR A MULTI-DIRECTIONAL ROTATIONAL MOTOR IN A SINGLE ROTATIONAL DIRECTION

(71) Applicant: Snap-on Incorporated, Kenosha, WI (US)

(72) Inventors: Dennis A. Nowak, Jr., Franklin, WI (US); John R. Williams, Brasstown, NC (US)

(73) Assignee: Snap-on Incorporated, Kenosha, WI (US)

( * ) Notice: Subject to any disclaimer, the term of this patent is extended or adjusted under 35 U.S.C. 154(b) by 981 days.

(21) Appl. No.: 14/633,400

(22) Filed: Feb. 27, 2015

(65) Prior Publication Data

US 2016/0252108 A1 Sep. 1, 2016

(51) Int. Cl.
*B23B 45/04* (2006.01)
*B25F 5/00* (2006.01)

(52) U.S. Cl.
CPC ................ *B25F 5/001* (2013.01); *B25F 5/00* (2013.01)

(58) Field of Classification Search
CPC ........ F15B 13/0402; B25F 5/00; B25F 5/001; B25F 5/005; B25F 5/02; F01C 20/04; F01C 20/08; F01C 20/14; B25D 9/00; B25D 9/26; B25B 21/00; B25B 21/02; B25B 21/026; B23B 45/044
USPC ........ 173/168, 169, 218, 221, 106, 107, 200
See application file for complete search history.

(56) References Cited

U.S. PATENT DOCUMENTS 3,618,633 A 11/1971 Bizilia et al.
3,951,217 A 4/1976 Wallace et al.
3,989,113 A 11/1976 Spring, Sr. et al.
4,016,940 A 4/1977 Spring, Sr.
4,418,764 A * 12/1983 Mizobe .................... B23Q 5/06 173/177
5,213,136 A 5/1993 Thorp et al.
5,293,747 A * 3/1994 Geiger .................... B25F 5/001 60/493

(Continued)

FOREIGN PATENT DOCUMENTS

CN 1553988 A 12/2004
CN 2719502 Y 8/2005

(Continued)

OTHER PUBLICATIONS

Taiwan Patent Application Office Action dated Aug. 11, 2016; 5 pages.

(Continued)

*Primary Examiner* — Gloria R Weeks
(74) *Attorney, Agent, or Firm* — Seyfarth Shaw LLP

(57) ABSTRACT

Mechanisms for reducing power output of a power tool by restricting airflow into the motor of the tool. The power regulator can be implemented in only one of the rotational directions, for example, the forward (or clockwise) direction, and can be independent of the forward/reverse mechanism to avoid a user becoming confused as to the source of tactile feedback. By limiting air input to the motor, rather than bleeding out motor output, the mechanisms prevent wasted power output. Also, the power regulation mechanism can be located near the motor to more effectively restrict airflow.

18 Claims, 4 Drawing Sheets

(56) References Cited

U.S. PATENT DOCUMENTS 5,417,294 A * 5/1995 Suher ........................ B25D 9/14 173/15
5,918,686 A * 7/1999 Izumisawa .............. B25B 21/00 173/169
6,047,780 A 4/2000 Lin
6,062,323 A * 5/2000 Pusateri ................... B25B 21/00 173/169
6,250,399 B1 * 6/2001 Giardino .................. B25B 21/00 173/218
6,796,386 B2 * 9/2004 Izumisawa .............. B25B 21/02 173/93.5
6,880,645 B2 * 4/2005 Izumisawa .............. B25B 21/00 173/169
6,883,617 B2 * 4/2005 Putney ................. B25B 23/1453 173/1
7,124,837 B2 * 10/2006 Martin .................. B23B 45/003 173/1
7,213,500 B2 * 5/2007 Chang ...................... B25F 5/001 173/168
7,775,295 B1 * 8/2010 Glaser ....................... B25D 9/04 137/455
7,958,944 B2 * 6/2011 Lehnert ............... B25B 23/1405 173/1
8,020,631 B2 * 9/2011 Kobayashi .............. B25B 21/00 137/625.43
8,739,832 B2 * 6/2014 Young ................... F16K 11/072 137/625.46
9,687,978 B2 * 6/2017 Kumar .................... B25F 5/005
2003/0230423 A1 * 12/2003 Izumisawa .............. B25B 21/00 173/107
2008/0066941 A1 * 3/2008 Kobayashi .............. B25B 21/00 173/218
2011/0139116 A1 6/2011 Herbruck
2011/0139474 A1 6/2011 Seith et al.
2011/0186315 A1 * 8/2011 Li ............................ B23Q 5/00 173/16
2011/0290357 A1 * 12/2011 Bass ..................... F16K 11/105 137/625.5
2012/0049665 A1 3/2012 Garriga et al.
2013/0081843 A1 * 4/2013 Tully ......................... B25F 5/02 173/221
2013/0156622 A1 * 6/2013 Lee .......................... B25B 21/00 417/545
2014/0020923 A1 * 1/2014 Su ............................ B25B 21/00 173/218
2014/0231111 A1 * 8/2014 Lehnert ..................... B23Q 5/06 173/1
2016/0258291 A1 * 9/2016 Griffin ..................... F01C 20/04
2016/0260559 A1 * 9/2016 Williams ................. G05G 1/08

FOREIGN PATENT DOCUMENTS

| | | | |
|---|---|---|---|
| CN | 101172338 | A | 5/2008 |
| CN | 201586966 | U | 9/2010 |
| CN | 201597000 | U | 10/2010 |
| CN | 201934186 | U | 8/2011 |
| CN | 102814795 | A | 12/2012 |
| DE | 202010006343 | U1 | 9/2010 |
| EP | 1323500 | A | 7/2003 |
| JP | 200730141 | A | 2/2007 |
| TW | 489167 | | 6/2002 |
| WO | 2012098496 | A | 7/2012 |

OTHER PUBLICATIONS

Chinese Office Action for Application No. 201610110672.7 dated Sep. 18, 2017, 6 pages.
English translation of Chinese Office Action for Application No. 201610110672.7 dated Sep. 18, 2017, 3 pages.
UK Intellectual Property Office Combined Search and Examination Report, dated Jun. 24, 2016, 6 pages.
Australian Patent Examination Report for Application No. 2016201204 dated Jul. 15, 2016, 7 pages.

* cited by examiner

CONTROLLING INCOMING AIR FOR A MULTI-DIRECTIONAL ROTATIONAL MOTOR IN A SINGLE ROTATIONAL DIRECTION

TECHNICAL FIELD OF THE INVENTION

The present invention relates generally to controlling the amount of power output of a rotational tool, such as a pneumatic or hydraulically powered tool. More particularly, the present invention relates to controlling power output by restricting the amount of air or fluid entering a rotational motor for only one of two rotational directions of the motor.

BACKGROUND OF THE INVENTION

Power tools commonly use pneumatic or hydraulic mechanisms for powering the tool. For example, impact wrenches use rotational motors having rotors that receive pressurized air or fluid to produce a rotational force to a work piece. The pressurized air or fluid causes rotation of the rotor of the motor.

Many times, a user may desire to reverse the rotational direction of the power tool, for example, when the work piece is left-hand threaded or when the user desires to loosen the work piece instead of tighten it with the power tool. Conventional power tools include reversing mechanisms that change the rotational direction of the tool so that the user can switch between clockwise and counterclockwise rotational directions of the tool. This is typically accomplished by an internal valve assembly that switches the internal direction of the pressurized air or fluid from one side of the rotor to the other.

Similarly, conventional power tools include mechanisms to control the power output of the tool by controlling the amount of pressurized air or fluid that effectively turns the rotor. However, such power tools cannot independently regulate the power output of only one of either the clockwise or counterclockwise rotational directions of the tool. Rather, such tools regulate both the clockwise and counterclockwise directions without discretion. Yet, it is often desirable to regulate rotational power output of the clockwise and counterclockwise rotational directions differently. For example, it is often desirable to require less power when tightening a work piece (such as when the tool is operated in the clockwise direction), and unrestricted or maximum power when loosening a work piece (such as when the tool is operated in the counterclockwise direction). However, since some power tools regulate power output in both rotational directions without differentiation, the conventional systems cannot control power output of only one of the rotational directions. Moreover, tools often regulate power using the same mechanism as the forward and reverse mechanism, causing the user to confuse the tactile feedback from the forward/reverse mechanism as that of the power regulator.

Moreover, some power tools typically regulate power by redirecting and releasing a certain amount of pressurized air delivered to the rotor of the motor, thus decreasing the amount of pressurized air that effectively rotates the rotor of the motor. The released air pressure is typically released from the tool to the environment, commonly known as "bleed off." Such bleed off air is thus wasted and unused, thus causing increased costs and time (e.g., an air compressor must run more often due to the released and unused air).

SUMMARY OF THE INVENTION

Embodiments of the present invention include methods and systems for controlling power output of one of the clockwise and counterclockwise rotational directions of a rotational pneumatically or hydraulically powered tool by selectively controlling the amount of air or fluid delivered to the rotor of the motor. The power regulator can be independent from the forward/reverse selection mechanism, thus providing its own, separate tactile feedback. By controlling the amount of air or fluid input to the rotor, rather than allowing undesirable air delivered to the rotor output to "bleed-off," the invention achieves greater power efficiency and less waste. Also, because the power regulation mechanism is located proximate the motor, the mechanism can be more effective at controlling air or fluid flow, and provides a compact and ergonomic configuration.

An embodiment of the present invention broadly comprises a mechanism for controlling air or fluid flow into a rotational motor having a rotor by including a plate having a tube and a passage allowing an amount of air or fluid passage into the rotor of the motor, a valve adapted to be inserted into the tube and maintained within the plate to control the direction of rotation of the motor, where the valve is selectively movable by a user to select one of either clockwise and counterclockwise rotational directions of operation of the motor, and a restrictor plunger disposed within the plate and selectively movable between a restricted position, where the plunger at least partially covers the opening and controls the amount of air or fluid entering the rotor of the motor, and an unrestricted position, where the opening is substantially unrestricted by the plunger and allows substantially unrestricted air or fluid flow into the rotor of the motor for maximum rotational power.

Another embodiment is a tool including a motor adapted to utilize pressurized air or fluid to power a tool, a controlling mechanism operatively coupled to the motor and including a plate having a tube and an opening allowing a passage of air or fluid into the rotor of the motor, a valve adapted to be inserted into the tube and maintained within the plate, the valve selectively movable by a user to select either of clockwise or counterclockwise directions of operation of the tool, and a plunger disposed within the plate and selectively movable between a restricted position, wherein the plunger at least partially covers the opening and restricts the amount of air or fluid entering the rotor of the motor, and an unrestricted position, wherein the opening is substantially unrestricted by the plunger and allows substantially unrestricted air or fluid into the rotor of the motor for maximum rotational power.

Yet, another embodiment is a method of directing air within a tool including causing operation of a motor that provides the air to a rotor of the tool, operating a tool in one of a clockwise or counterclockwise directions of operation, and actuating a pin to control airflow to a motor of the tool only when operating the tool in the clockwise direction.

BRIEF DESCRIPTION OF THE DRAWINGS

For the purpose of facilitating an understanding of the invention, there are illustrated in the accompanying drawings embodiments thereof, from an inspection of which, when considered in connection with the following description, the invention, its construction and operation, and many of its advantages should be readily understood and appreciated.

DETAILED DESCRIPTION OF THE EMBODIMENTS

Figure 1:
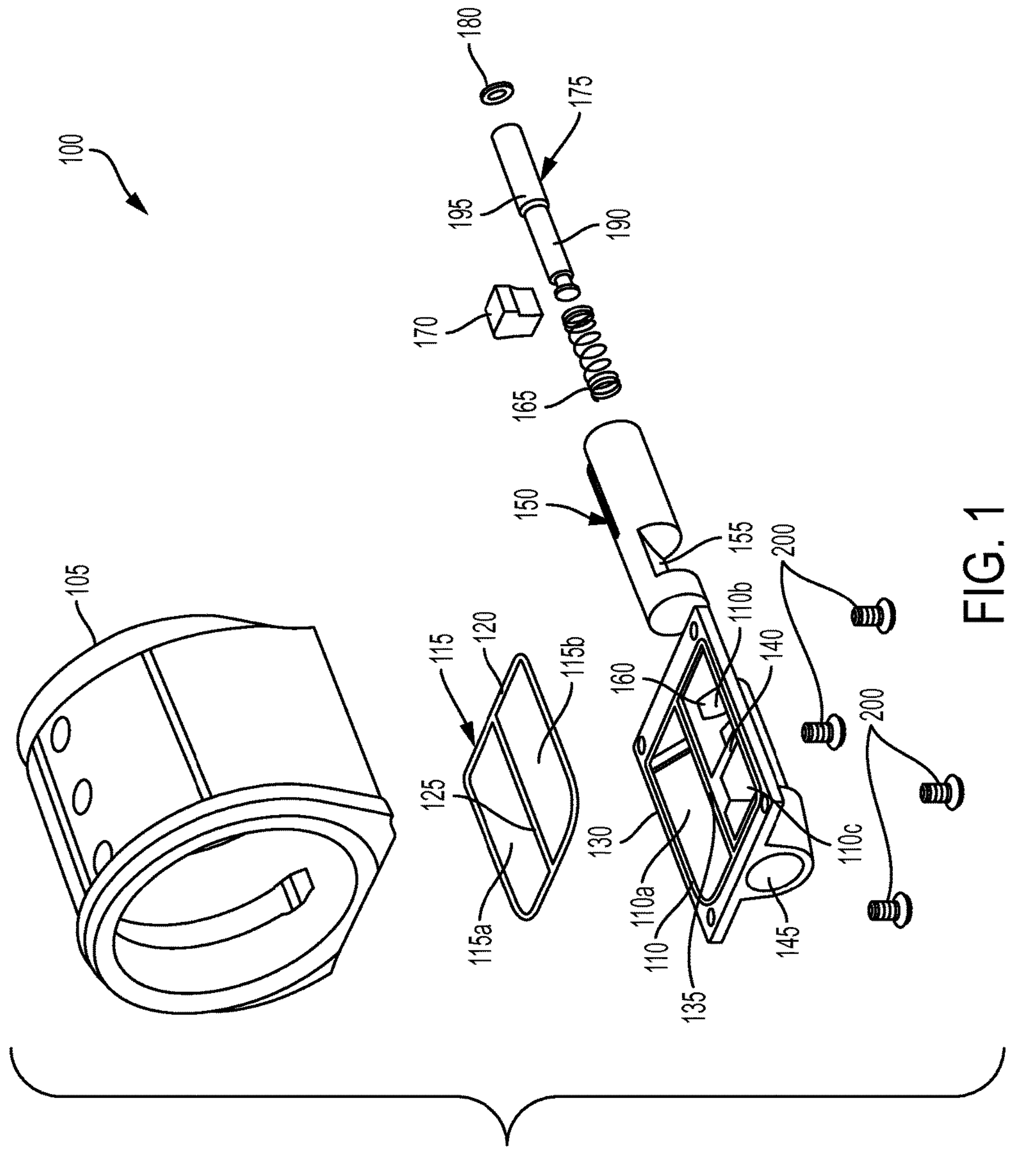
FIG. 1 is a front, perspective, exploded view of a tool according to embodiments of the present application.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the invention and is not intended to limit the broad aspect of the invention to embodiments illustrated.

While the present invention is discussed in terms of a pneumatically powered tool, such as, for example, an impact wrench, it will be appreciated that the invention can be used with any fluid or air powered tools, such as, for example, hydraulic tools, without departing from the scope and spirit of the present invention.

Embodiments of the present invention broadly comprises methods and systems for controlling rotational power of a power tool having an output, such as a pneumatically powered tool, for only one of first and second rotational output directions, such as clockwise and counterclockwise, of the tool. The systems control power output by restrictively controlling the amount of airflow into the rotor of the motor. Moreover, the power control mechanism can be independent of the reversing mechanism to avoid user confusion. By controlling the amount of air input to the rotor of the motor, rather than bleeding off air delivered to the rotor, the invention prevents wasted power, such as in the form of pressurized air or fluid. Also, because the power control mechanism is located near the motor, the mechanism more effectively controls airflow to the rotor and allows for a compact and ergonomic design of the tool.

Referring to FIGS. 1-4, a power control mechanism 100 is shown having a cylinder 105 for receiving pressurized air for a rotor of a motor of a rotational tool. The cylinder 105 can be coupled to a plate 110 with a gasket 115 disposed therebetween that creates a substantially air-tight or fluid-tight connection between the cylinder 105 and plate 110. The gasket 115 can include a first gasket portion **115*a* aligned with a first plate portion 110*a*, and a second gasket portion 115*b* aligned with second 110*b* and third 110*c* plate portions. In particular, the gasket 115 can include a gasket perimeter 120 and a gasket divider 125 dividing the gasket into first gasket portion 115*a* and the second gasket portion 115*b*. Similarly, the plate 110 can include a plate perimeter 130 extending around a periphery of the plate 110, a plate divider 135 dividing the plate 110 axially, and a wall 140 separating the second plate portion 110*b* from the third plate portion 110*c*. Fasteners 200, such as screws or rivets, can also be used to couple the plate 110 to the cylinder 105, or any other component. The fasteners 200 can be any object capable of fastening two or more components together. For example, the fasteners 200** can be any type of screw, bolt, rivet, nail, adhesive, welding, or any other mechanism capable of coupling two objects together.

The cylinder 105 houses a rotor of the motor that rotates to provide power to the output of the power tool. Conventional tools commonly include a valve or other device in the cylinder to "bleed off" excess air entering the cylinder to control the power output, wasting the air but reducing the power output of the motor. The present invention, however, restricts or controls the amount of air entering the cylinder 105 that houses the rotor to provide the desired output of power, rather than bleeding off the excess air from the cylinder.

The plate 110 can include a tube 145 adapted to receive a valve 150 having a barrier 155 that selectively directs pressurized air to the cylinder 105, and thus rotor, to facilitate either the clockwise or counterclockwise rotational directions of the rotor of the motor, which translates to respective clockwise and counterclockwise rotational directions of output of the tool. For example, the valve 150 can be aligned in a first position such that the barrier 155 directs pressurized air in a first direction (e.g., toward the first plate portion **110*a*), causing the power tool to operate in the clockwise direction, or the valve 150 can be aligned in a second position such that the barrier 155 directs pressurized air in a second direction (e.g., toward the second plate portion 110*b*), causing the power tool to operate in the counterclockwise direction. In an embodiment, the counterclockwise direction is unrestricted to allow maximum, unrestricted air pressure to be delivered to the rotor, thus allowing maximum rotational power in the counterclockwise direction. In an embodiment, a user can selectively rotate the valve 150** between the first and second positions to select either of the clockwise or counterclockwise rotational directions of the tool.

Figure 2:
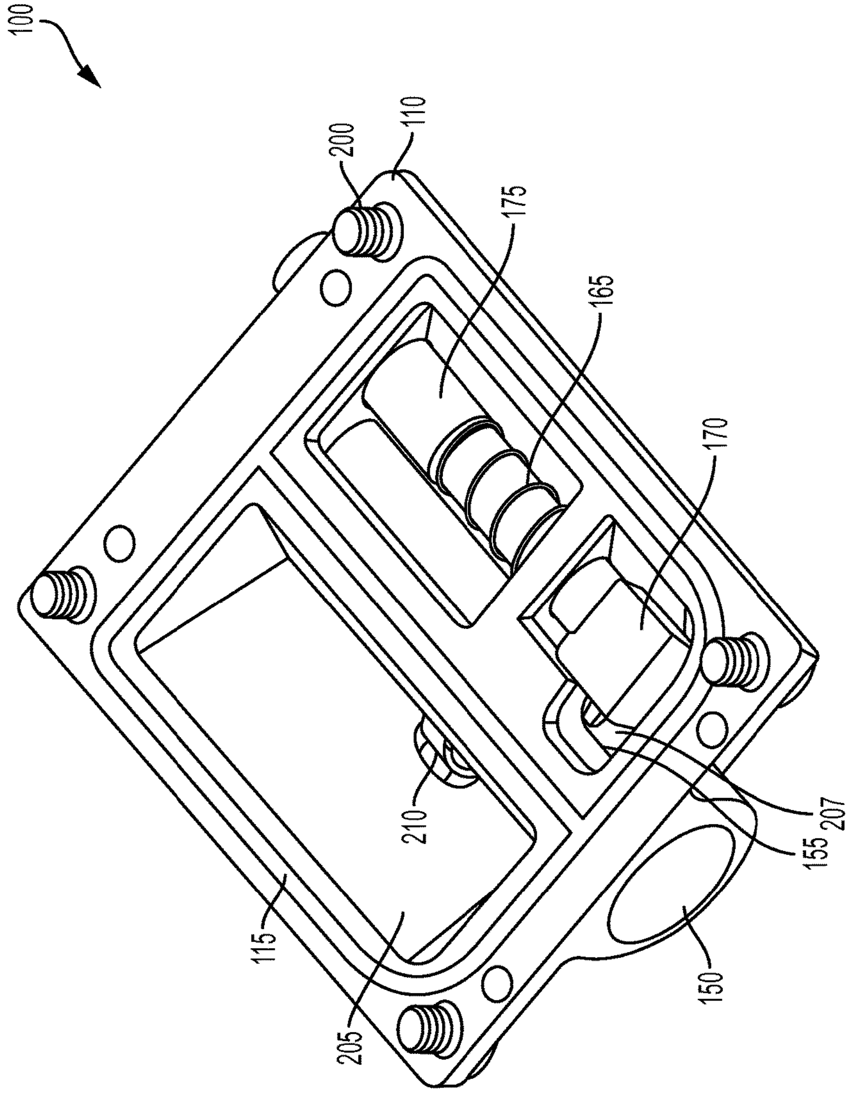
FIG. 2 is a top, perspective view of the tool as assembled, and as disposed in the high restriction position.
Figure 3:
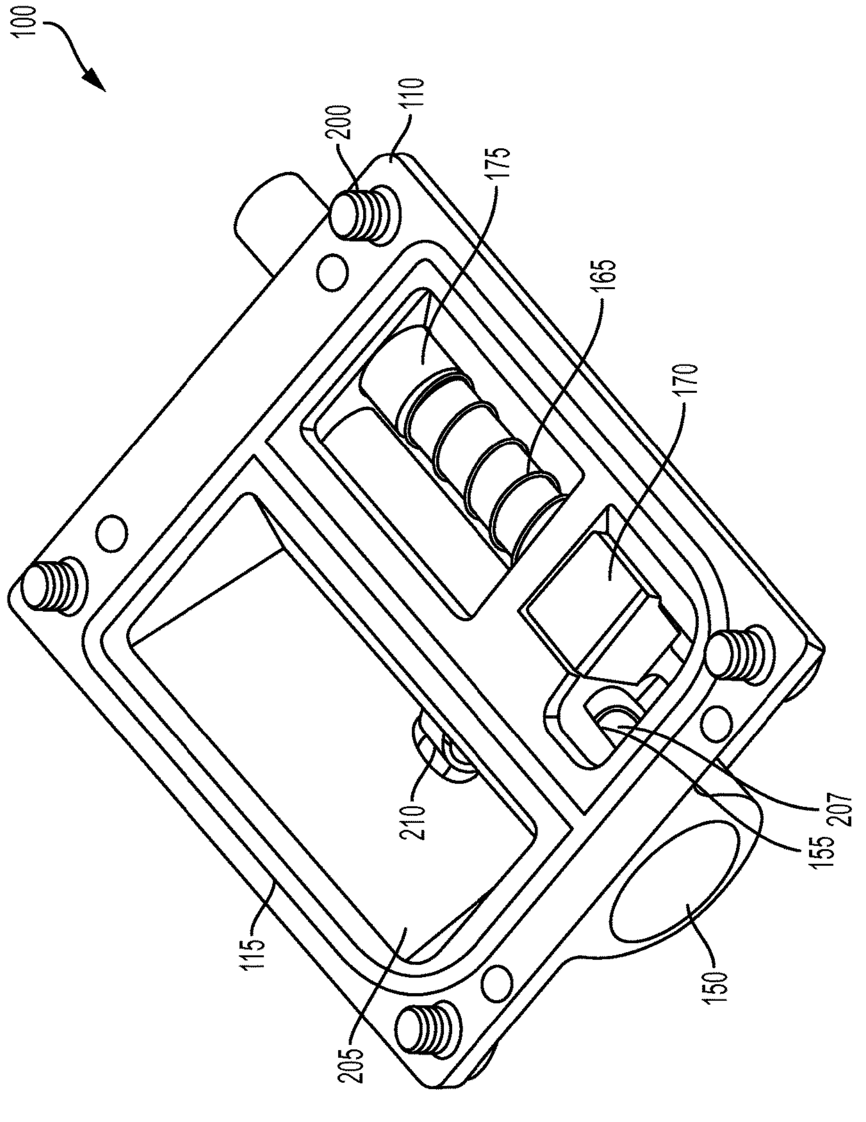
FIG. 3 is a top, perspective view of the tool as assembled, and as disposed in the low restriction position.
Figure 4:
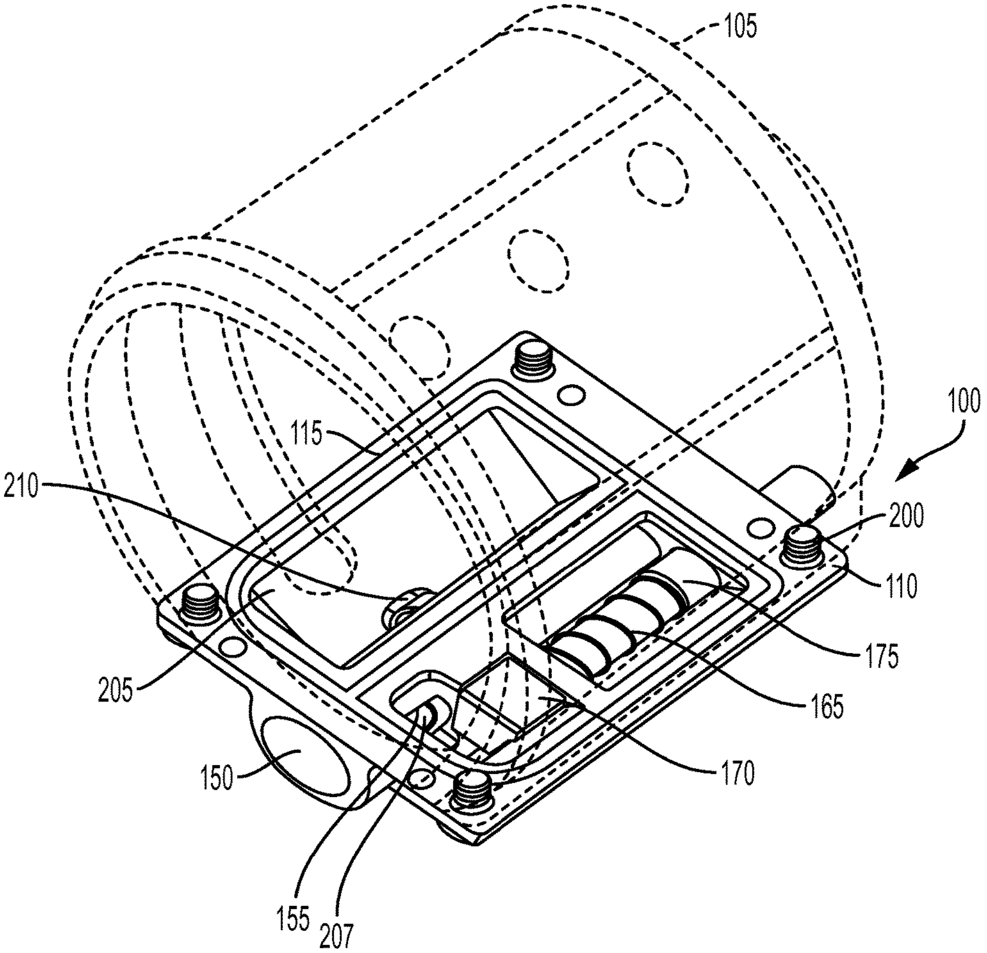
FIG. 4 is a top, perspective view of a tool as assembled, with a cylinder, according to embodiments of the present application.

Referring to FIGS. 2 and 3, the mechanism 100 is shown as selected for operating in the forward (or clockwise) direction because the barrier 155 is aligned to allow the passage of air from the third plate portion **110*c*. For example, if the mechanism 100 and power tool were operating in the reverse direction, the barrier 155 would align toward the first plate portion 110*a*. As a result, when operating in the reverse direction, the mechanism 100 operates the motor at substantially full power output capacity with substantially unrestricted air flowing into the cylinder 105. The user can select the forward or reverse mechanism in any manner (e.g., rotation of the valve 150), and in doing so, can shift the barrier 155 toward the first plate portion 110*a* or the third plate portion 110*c***, to choose the forward or reverse direction of operation.

The plate 110 can further include a cylinder 160 adapted to receive a biasing member 165, control plunger 170, and pin 175. An O-ring 180 can be circumferentially disposed around the pin 175 at a first ledge, thereby providing a substantially air-tight or fluid-tight seal between the inner wall of the cylinder and the pin 175, when the pin 175 is disposed in the cylinder 160, and the bias member 165 can be circumferentially disposed around an extension 190 of the pin 175 and abut against a second ledge 195 so as to form an elastically-biased member that can be movably actuated by the user to control the amount of air flow into the motor of the mechanism 100.

The plunger 170 can couple to the pin 175 in any known manner. For example, the plunger 170 can be coupled to the pin 175 with adhesive or a fastener, or can be coupled to the pin 175 based on an interference or snap fit between the plunger 170 and the pin 175. In some embodiments, the plunger 170 can be made of rubber or other flexible material and the pin 175 can insert into the flexible material through an opening of the plunger 170. Any other coupling mechanism between the plunger 170 and the pin 175 can be implemented without departing from the spirit and scope of the present invention.

The mechanism 100 can include a first opening 205 connecting the first plate portion **115*a* with a first portion of the cylinder 105, and a second opening 207 connecting the second 110***b* and third plate portion 110*c* with a second portion of the cylinder 105. For example, the first opening 205 can direct the airflow from the plate 110 to the cylinder 105 when operating in the reverse or counterclockwise direction, and the second opening 207 can direct the airflow from the plate 110 to the cylinder 105 when operating in the forward or clockwise direction. The openings 205, 207 can be inlets to the cylinder 105 and outlets from the plate 110 so as to selectively provide air to the cylinder 105 based on the positioning of the valve 150. For example, when the barrier 155 of the valve 150 directs air towards the first plate portion 110*a*, the first opening 205 can provide the necessary air to the cylinder 105, and when the barrier 155 directs air towards the second 110*b* and third 110*c* plate portion, the second opening can provide the necessary air to the cylinder 105.

The mechanism 100 controls the amount of pressurized air entering the cylinder 105 by axially moving the plunger 170 to change the size or surface area of the second opening 207 to the cylinder 105. For example, as shown in FIG. 2, the plunger 170 can partially cover the second opening 207, thus reducing the size of second opening 207. Accordingly, to limit power output, the plunger 170 reduces the amount of air flowing into the cylinder 105, rather than allowing an unrestricted amount of air to flow into the motor and bleeding off excess air to reduce power output. The mechanism 100 therefore achieves an efficient distribution of power by controlling power output in, for example, only the clockwise direction, while allowing maximum power in the opposite direction, for example counterclockwise direction.

The pin 175 can be actuated inwardly to operate the mechanism 100 in the restricted air position using any method. For example, a button can actuate the pin 175 inwardly, or a knob that rotates and imparts axial displacement of the pin 175 based on the rotation of the knob (for example, a cam mechanism). The axial actuation of the pin 175 causes selective movement of the plunger 170 to control the second opening 207 size, thus controlling the amount of pressurized air delivered to the cylinder 105. For example, if the pin 175 is only slightly actuated inwardly, the plunger 170 only partially restricts the second opening 207, thus only slightly reducing the size of the second opening 207 to slightly reduce the amount of air delivered to cylinder 105. It will thus be appreciated that the more that the user causes the pin 175 to be moved axially inwardly, the more that plunger 170 will restrict the second opening 207, thus reducing the second opening 207 size, which reduces the amount of pressurized air delivered to cylinder 105. It will further be appreciated that since the plunger 170 only affects the size of the second opening 207, it only affects the amount of air delivered for one rotational direction of the motor, and not the other. Thus, movement of the pin 175 controls power output in only the clockwise direction, and not the counterclockwise direction, for example. In such a configuration, when counterclockwise rotational direction is selected, such as when removing or loosening a work piece, maximum rotational output can be utilized, which is desirable, without modifying the power restriction of the clockwise rotational direction. On the other hand, when selecting the clockwise rotational direction of the tool, such as when tightening a work piece, controlled rotational output can be utilized.

The mechanism 100 can also include a brace 210 for maintaining a position of the valve 150 during operation of the mechanism 100. The brace 210 can be an arcuate or cylindrical body coupled to the plate 110 and substantially retaining the valve 150 and preventing it from being dislodged during operation of the power tool. The brace 210 can therefore allow the valve 150 to be rotatable about the longitudinal axis of the valve 150 and rotate based on user control to select either the clockwise or counterclockwise rotational directions of operation. That is, when a user causes the valve 150 to be rotated in a first rotational direction, the barrier 155 rotates with the valve 150 and aligns itself in a direction substantially tangential to the desired rotational direction of the rotor of the power tool. By maintaining the positioning of the valve 150 with the brace 210, the valve 150 can rotate within the tube 145 and be coupled at the axial ends of the valve 150 to other components of the power tool to avoid axial displacement of the valve 150.

The bias member 165 can extend around the pin 175 at the extension 190, abut against the second ledge 195 on one end of the elastic member 165, and abut against the wall 140 at the other end of the bias member 165. As a result, the mechanism 100 is elastically biased toward the open position where substantially no air restriction occurs, as shown in FIG. 3, and thus maximum power output is obtained. However, if the user chooses to actuate the pin 175 and push it axially inward, the mechanism 100 can operate in a variably restricted position where the amount of air entering the cylinder 105 can be controlled by restriction based on the amount the pin 175 is axially actuated inwardly, as shown in FIG. 2.

As shown, the bias member 165 is a coil spring, but the bias member 165 can be a leaf spring, torsion or double torsion spring, tension spring, compression spring, tapered spring, or simply an object elastically biased against the wall 140 and second ledge 195. Further, the bias member 165 need not be a spring at all, or even an elastically biased object, and can be any object that applies an electrical, magnetic, mechanical, or any other type of force to the wall 140 and second ledge 195 to better bias the mechanism 100 in the unrestricted position. Any other implementation of the elastic member 165 can be carried out without departing from the spirit and scope of the present invention.

As used herein, the term "coupled" and its functional equivalents are not intended to necessarily be limited to a direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and/or described, it will be apparent to those skilled in the art that changes and modifications may be made without departing from the broader aspects of the invention. The actual scope of the protection sought is intended to be defined in the following claims when viewed in their proper perspective.

What is claimed is:

1. A mechanism for controlling pressurized fluid or air to operate a rotor of a motor having an output adapted to selectively rotate in either of first and second rotational directions, comprising:

a plate having first and second openings, each of the first and second openings allows passage of the pressurized fluid or air to the rotor, wherein when the pressurized fluid or air passes through the first opening, the output rotates in the first rotational direction, and when the pressurized fluid or air passes through the second opening, the output rotates in the second rotational direction;

a valve disposed in the plate and rotatable to cause the pressurized fluid or air to be directed through one of the first and second openings, thus causing the selection of either of the first and second rotational directions of the output; and a plunger disposed within the plate downstream of the valve, wherein the plunger is movable, relative to the first opening, between a restricted position, wherein the plunger partially restricts the first opening, and an unrestricted position, wherein the first opening is unrestricted.

2. The mechanism of claim 1, wherein the plate further includes a tube and the valve is disposed in the tube.

3. The mechanism of claim 2, wherein the valve includes a barrier and the valve is selectively rotatable between first and second positions, wherein when the valve is disposed in the first position, the barrier directs the pressurized fluid or air towards the first opening, and when the valve is disposed in the second position, the barrier directs the pressurized fluid or air towards the second opening.

4. The mechanism of claim 3, wherein the plate includes a plate divider dividing the plate into first and second portions respectively having the first and second openings, wherein when the valve is disposed in the first position, the barrier directs the pressurized fluid or air towards the first portion, and when the valve is disposed in the second position, the barrier directs the pressurized fluid or air towards the second portion.

5. The mechanism of claim 4, wherein the plunger is located proximate the first portion and is adapted to cause the pressurized fluid or air to flow to only the first portion.

6. The mechanism of claim 5, further comprising a pin coupled to the plunger, wherein the plate further includes a hole and the pin is disposed within the hole.

7. The mechanism of claim 1, further comprising a pin coupled to the plunger.

8. The mechanism of claim 7, further comprising a bias member operatively coupled to the pin to bias the plunger towards the unrestricted position.

9. The mechanism of claim 8, wherein the pin includes a ledge and the plate includes a wall, wherein the bias member is biased against the ledge and the wall.

10. The mechanism of claim 8, wherein the bias member is an elastic bias member.

11. A tool having a motor with a rotor disposed in a housing that is adapted to be operated with air or fluid, and an output that selectively rotates in first and second rotational directions, the tool comprising:

a mechanism for controlling a direction of at least a portion of the air or fluid, the mechanism includes:

a plate having first and second openings, each of the openings is adapted to direct the portion of the air or fluid into the housing and to the rotor, wherein when the portion of the air or fluid is directed through the first opening, the output rotates in the first rotational direction, and when the portion of the air or fluid is directed through the second opening, the output rotates in the second rotational direction;

a valve disposed in the plate and rotatable to cause the portion of the air or fluid to be directed through one of the first and second openings, thus selecting either of the first and second rotational directions of the output; and a plunger disposed within the plate downstream of the valve, wherein the plunger is movable relative to the first opening, and wherein the plunger is movable between a restricted position, wherein the plunger partially restricts the first opening, and an unrestricted position, wherein the first opening is unrestricted.

12. The tool of claim 11, wherein the plate further includes a tube and the valve is disposed in the tube.

13. The tool of claim 12, wherein the valve includes a barrier and the valve is selectively rotatable between first and second positions, wherein when the valve is disposed in the first position, the barrier directs the portion of the air or fluid towards the first opening, and when the valve is disposed in a second position, the barrier directs the portion of the air or fluid towards the second opening.

14. The tool of claim 13, wherein the plate includes a plate divider dividing the plate into first and second portions respectively having the first and second openings, wherein when the valve is disposed in the first position, the barrier directs the portion of the air or fluid towards the first portion, and when the valve is disposed in the second position, the barrier directs the portion of the air or fluid towards the second portion.

15. The tool of claim 14, wherein the plunger is located proximate the first portion and is adapted to direct the flow of the portion of the air or fluid to only the first portion.

16. The tool of claim 11, further comprising a pin coupled to the plunger.

17. The tool of claim 16, further comprising a bias member operatively coupled to the pin to bias the plunger towards the unrestricted position.

18. The tool of claim 17, wherein the pin includes a ledge and the plate includes a wall, wherein the bias member is biased against the ledge and the wall.

* * * * *